United States Patent [19]
McGill

[11] Patent Number: 6,105,820
[45] Date of Patent: *Aug. 22, 2000

[54] CONFECTION DISPENSING APPARATUS

[75] Inventor: Shane Robert McGill, Rochester, United Kingdom

[73] Assignee: McGill Technology Limited, United Kingdom

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/834,198

[22] Filed: Apr. 15, 1997

Related U.S. Application Data

[63] Continuation of application No. 08/431,479, May 1, 1995, Pat. No. 5,620,115, which is a continuation of application No. 08/003,578, Jan. 13, 1993, abandoned, which is a division of application No. 07/713,978, Jun. 11, 1991, Pat. No. 5,215,222, which is a division of application No. 07/399,536, Aug. 10, 1989, Pat. No. 5,069,364.

[30]     Foreign Application Priority Data

Oct. 12, 1987 [GB] United Kingdom .................. 8728904
Jul. 10, 1988 [GB] United Kingdom .................. 8823584
Jul. 12, 1988 [GB] United Kingdom .... PCT/GB88/01054

[51] Int. Cl.⁷ .................................................. B65D 37/00

[52] U.S. Cl. ........................ 222/95; 222/146.6; 222/309

[58] Field of Search .......................... 222/95, 105, 146.6, 222/214, 326, 380, 386, 386.5, 390, 387, 534, 536, 537, 183, 185, 309, 434, 2, 107

[56]             References Cited

U.S. PATENT DOCUMENTS

| Re. 32,379 | 3/1987 | Touzani .................... 215/1 C |
| D. 268,840 | 5/1983 | Reed ......................... D7/300 |
| D. 272,404 | 1/1984 | Angelakos ................. D7/17 |
| D. 285,082 | 8/1986 | Verkler ..................... D15/82 |
| D. 307,754 | 5/1990 | Osrow et al. .............. D15/82 |
| D. 364,175 | 11/1995 | Alpers et al. ............. D15/82 |
| D. 365,496 | 12/1995 | McLinden et al. ........ D7/379 |
| 1,663,677 | 3/1928 | Byerly ....................... 222/95 |
| 2,120,640 | 6/1938 | Craemer . |

(List continued on next page.)

FOREIGN PATENT DOCUMENTS

| 0448571 | 5/1948 | Canada ...................... 92/45 |
| 0285709 | 4/1987 | European Pat. Off. . |
| 246052 | 11/1987 | European Pat. Off. ................. 222/95 |
| 0314209 | 5/1989 | European Pat. Off. . |
| 89500092 | 9/1989 | European Pat. Off. . |
| 406134 | 1/1991 | European Pat. Off. . |
| 1168470 | 1/1957 | France ....................... 92/44 |
| 1219079 | 5/1960 | France . |
| 8800013 | 1/1988 | France . |
| 521761 | 3/1931 | Germany . |
| 3618634 | 12/1987 | Germany ................. 222/105 |
| 0378615 | 2/1940 | Italy ............................ 92/45 |
| 649587 | 1/1989 | Japan . |
| 372974 | 12/1963 | Switzerland . |
| 653136 | 5/1951 | United Kingdom . |
| 1300386 | 12/1972 | United Kingdom . |
| 2230057 | 10/1990 | United Kingdom . |
| 2234556 | 2/1991 | United Kingdom . |
| 8200456 | 2/1982 | WIPO ..................... 222/103 |
| 8703557 | 6/1987 | WIPO . |
| 8801054 | 12/1988 | WIPO . |
| 8905096 | 6/1989 | WIPO . |
| 9005697 | 5/1990 | WIPO ........................ 5/62 |
| 9219389 | 11/1992 | WIPO . |
| 9413154 | 6/1994 | WIPO . |

*Primary Examiner*—Gregory L. Huson
*Attorney, Agent, or Firm*—Gifford, Krass, Groh, Sprinkle, Anderson & Citkowski, P.C.

[57]             ABSTRACT

A frozen confection dispenser includes a collapsible container for the confection such as ice cream and a piston for selectively collapsing the container to extrude the confection from the container through an outlet to a cone or the like.

59 Claims, 7 Drawing Sheets

U.S. PATENT DOCUMENTS

| Number | Date | Name | Class |
|---|---|---|---|
| 2,242,407 | 5/1941 | Tobey | 62/254 |
| 2,401,417 | 6/1946 | Engle . | |
| 2,408,704 | 10/1946 | Taylor | 222/160 |
| 2,558,887 | 7/1951 | Tesiero | 222/146.6 |
| 2,559,840 | 7/1951 | Arthur | 222/146.6 |
| 2,631,761 | 3/1953 | Gates | 222/390 |
| 2,752,068 | 6/1956 | Bryant | 222/529 |
| 2,889,949 | 6/1959 | Nirenberg | 214/310 |
| 3,081,920 | 3/1963 | Gorychka et al. | 222/509 |
| 3,104,031 | 9/1963 | Wagner | 222/390 X |
| 3,155,281 | 11/1964 | Stracey | 222/107 |
| 3,157,314 | 11/1964 | Nadler . | |
| 3,178,061 | 4/1965 | Giacalone | 222/146 |
| 3,250,433 | 5/1966 | Christine | 222/129 |
| 3,288,333 | 11/1966 | Valk, Jr. | 222/386.5 |
| 3,330,129 | 7/1967 | Halverson et al. | 222/145 |
| 3,349,973 | 10/1967 | Smith | 222/380 |
| 3,371,822 | 3/1968 | Galloway | 222/95 |
| 3,413,820 | 12/1968 | Paquin . | |
| 3,435,996 | 4/1969 | Jones | 222/386.5 |
| 3,677,443 | 7/1972 | Smadar | 222/94 |
| 3,826,409 | 7/1974 | Chilcoate | 222/107 |
| 4,022,031 | 5/1977 | Calim | 62/66 |
| 4,098,434 | 7/1978 | Uhlig | 222/94 |
| 4,155,304 | 5/1979 | Schweisser et al. | 101/366 |
| 4,163,802 | 8/1979 | Redfern et al. | 426/43 |
| 4,169,548 | 10/1979 | Bond | 222/505 |
| 4,213,545 | 7/1980 | Thompson et al. | 222/386.5 |
| 4,231,492 | 11/1980 | Rois | 222/1 |
| 4,293,082 | 10/1981 | Matsueda | 222/131 |
| 4,335,835 | 6/1982 | Beigler | 222/95 |
| 4,386,717 | 6/1983 | Koob | 222/94 |
| 4,420,948 | 12/1983 | Savage | 62/340 |
| 4,423,829 | 1/1984 | Katz | 222/95 |
| 4,452,823 | 6/1984 | Connolly | 426/115 |
| 4,458,830 | 7/1984 | Werding | 222/131 |
| 4,484,697 | 11/1984 | Fry, Jr. | 222/95 |
| 4,492,313 | 1/1985 | Touzani | 215/1 C |
| 4,506,988 | 3/1985 | Reed | 366/203 |
| 4,574,987 | 3/1986 | Halligan et al. | 222/107 |
| 4,651,538 | 3/1987 | Bull et al. | 62/398 |
| 4,660,740 | 4/1987 | Brandon, Jr. et al. | 222/1 |
| 4,711,373 | 12/1987 | Christine | 222/327 |
| 4,711,376 | 12/1987 | Manfroni | 222/146.1 |
| 4,722,457 | 2/1988 | Bedwell et al. | 222/103 |
| 4,723,688 | 2/1988 | Munoz | 222/88 |
| 4,753,371 | 6/1988 | Michielin et al. | 222/145 |
| 4,773,458 | 9/1988 | Touzani | 150/55 |
| 4,775,564 | 10/1988 | Shriver et al. | 428/35 |
| 4,796,784 | 1/1989 | Spirk et al. | 222/80 |
| 4,871,001 | 10/1989 | Nobuta et al. | 141/279 |
| 4,913,713 | 4/1990 | Bender | 62/3.61 |
| 4,921,135 | 5/1990 | Pleet | 222/82 |
| 4,921,147 | 5/1990 | Poirier | 222/527 |
| 4,938,386 | 7/1990 | Roethel et al. | 222/92 |
| 5,002,193 | 3/1991 | Touzani | 220/666 |
| 5,048,724 | 9/1991 | Thomas | 222/95 |
| 5,060,826 | 10/1991 | Coleman | 222/95 |
| 5,069,364 | 12/1991 | McGill | 222/95 |
| 5,071,034 | 12/1991 | Corbiere | 222/80 |
| 5,090,963 | 2/1992 | Gross et al. | 604/132 |
| 5,100,025 | 3/1992 | McGraw | 222/95 |
| 5,150,820 | 9/1992 | McGill | 222/95 |
| 5,188,261 | 2/1993 | Butters | 222/107 |
| 5,215,222 | 6/1993 | McGill | 222/95 |
| 5,232,027 | 8/1993 | Tanaka et al. | 141/270 |
| 5,265,764 | 11/1993 | Rowe et al. | 222/95 |
| 5,269,428 | 12/1993 | Gilbert | 215/100 |
| 5,305,924 | 4/1994 | Groover et al. | 222/129 |
| 5,333,761 | 8/1994 | Davis et al. | 222/212 |
| 5,361,941 | 11/1994 | Parekh et al. | 222/95 |
| 5,405,054 | 4/1995 | Thomas | 222/95 |
| 5,407,093 | 4/1995 | McGill | 220/666 |
| 5,421,484 | 6/1995 | Beach | 222/96 |
| 5,435,463 | 7/1995 | Hodgson | 222/105 |
| 5,463,878 | 11/1995 | Parekh et al. | 62/394 |
| 5,464,120 | 11/1995 | Alpers et al. | 222/1 |
| 5,492,249 | 2/1996 | Beach | 222/96 |
| 5,505,336 | 4/1996 | Montgomery et al. | 222/82 |

CONFECTION DISPENSING APPARATUS

The present invention is a continuation of U.S. patent application Ser. No. 08/431,479 filed May 1, 1995 and now U.S. Pat. No. 5,620,115, which was a continuation of U.S. patent application Ser. No. 08/003,578 filed Jan. 13, 1993, now abandoned, and which was a divisional of U.S. patent application Ser. No. 07/713,978 filed Jun. 11, 1991 and now U.S. Pat. No. 5,215,222 which was a divisional of U.S. patent application Ser. No. 07/399,536 filed Aug. 10, 1989 and now U.S. Pat. No. 5,069,364.

This invention relates to dispensing apparatus and in particular to apparatus for dispensing frozen material such as ice cream or other frozen, semi-frozen or chilled confectionery.

Ice cream is usually dispensed at the point of sale in prepacked form, by scoops out of containers in a refrigerator, or in a flow from a freezing, mixing and dispensing machine.

Prepacked ice cream is relatively expensive to produce and distribute but has the advantage that a wide range of flavors and types of ice cream can be sold at a single outlet. The only requirement is a refrigerator to keep the produce frozen.

Dispensing ice cream by a scoop from a container has the advantage of cheapness in production and transport but dispensing of the ice cream is slow, especially when the proper hygiene precautions are taken. Scoop-dispensed ice cream also provides the facility for providing a range of ice cream including those containing fruit, nuts and other solids.

Machines for dispensing so called 'soft' ice cream are known in which liquid ingredients are loaded into the machine which mixes, freezes and dispenses the ice cream into cones or other containers. Such machines have previously had high power requirements and are expensive to manufacture. Different mixing and dispensing equipment is required for each flavor so it is useful for such machines to have only a one, two or, perhaps, three flavour facility. Moreover the machines are often difficult to maintain and due to the nature of the product which must be used the ice cream does not compare favorably with the quality possible with scoop dispensed products.

In U.S. Pat. No. 4,452,823 there is described a dispenser for frozen food product in which a collapsible container for the product is fitted with a spout through which the product is extruded directly into a receiving member.

An object of the invention is to provide dispensing apparatus which overcomes problems and disadvantages of existing systems.

According to the invention dispensing apparatus for dispensing a frozen product comprises deformable container means for containing the frozen product in semi-solid form to be dispensed, the container means having outlet means through which the product it discharged, dispensing means for deforming and reducing the internal volume of the container means whereby to cause product in the container means to issue from the outlet means, drive means operable to cause the dispensing means to discharge incremental quantities of product by progressive deformation of the container means, valve means for controlling the discharge of product by the dispensing means, a housing for the container means, and refrigeration means whereby the housing and container means are kept at a low temperature to maintain the product in a frozen condition in operation.

Preferably the valve means includes a shut-off valve operation of which allows product to be dispensed and the shut-off valve is interposed in duct means through which the product passes from the container means to an outlet, at least part of the duct means being movable in an out of the housing between operating and non-operating positions.

Conveniently the container means is located in an upright position in the apparatus during discharge, the outlet means being at the lower end of the container means.

The drive means may include motor means rotation of which causes the product to be dispensed by driving a plunger against the container means, and the plunger moves parallel to the axis of the container so that rotation of the motor effects a dispensing operation by deforming the container.

Conveniently the motor means is coupled to the plunger by a rotary member extending parallel to the axis of movement of the plunger and driven by the motor means, threaded engagement between the rotary member and the plunger causing said movement of the plunger when the rotary members are rotated.

The apparatus may include an upright frame having an intermediate platform for supporting the container means, above which platform is the container housing and below which is the outlet means. The outlet means may also, at least in part, be located in a refrigerated housing.

A movable support may be provided for the container means, the support being mounted on the intermediate platform and movable to a discharge position to load and unload the container means in the container housing.

The invention also provides container means for use with the dispensing apparatus of the invention comprising a generally cylindrical body with deformable side walls and an outlet at one end, the opposite end of the body being arranged for engagement by the dispensing means.

The container means may have side walls in the manner of a bellows such that one end of the container means is movable towards the other, outlet and to effect a reduction in the internal space under the action of the drive means.

The valve controlling the discharge of product during operation of the drive means may have a flexibly-walled tube and the valve is operated by pinching together the walls of the tube by control means.

Further features of the invention will appear from the following description of an embodiment of the invention given by way of example and with reference to the drawings in which.

Figure 1:
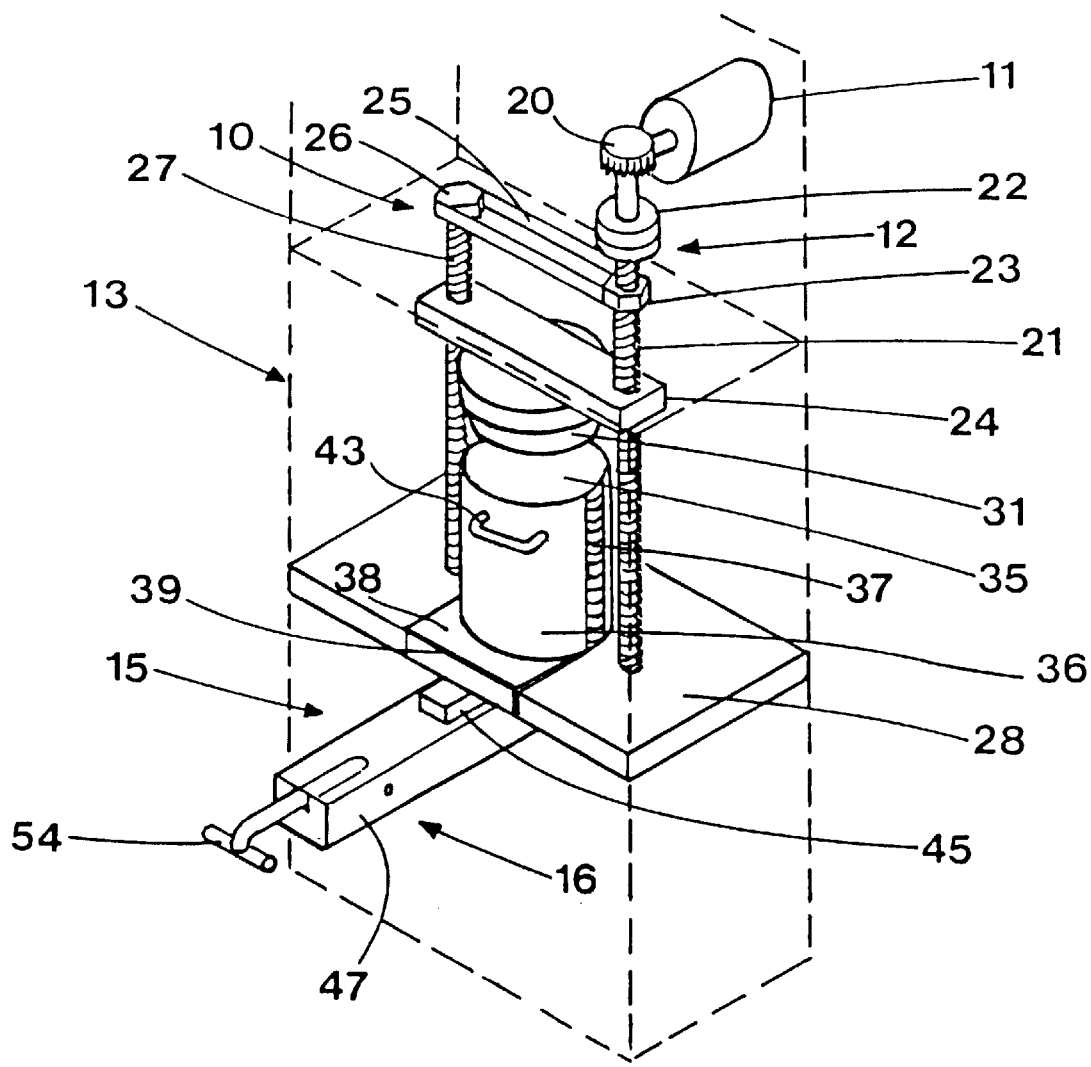
FIG. 1 is a part sectional front elevation.

Referring to the drawings dispensing apparatus is shown which includes an upright frame defining three or more compartments or housings. An upper compartment 10 houses a drive motor 11 and transmission means 12; an intermediate compartment 13 houses a further part of the transmission means and a container 14 for the product to be dispensed; and a lower compartment 15 houses the discharge means 16 for discharging the product from the container 14. A rear part 17 of the apparatus houses a compressor and refrigeration means (not shown) which may be of known form.

Each of the intermediate and lower compartments 13 and 15 are insulated and refrigerated, at least in part, to retain the product in the container 14 and in the discharge means 16 at the necessary low temperature during storage and dispensing.

The drive means for the dispenser as best seen in FIG. 1, includes the drive motor 11, conveniently a D.C. electric motor, the rotary drive shaft of which drives, through a right angle or bevel gear 20, a vertical shaft 21 including a clutch 22 and carrying a drive pulley 23. Below the pulley 23 the shaft 21 is threaded and threadedly engages a pressure bar 24. A drive belt 25 passes around the pulley 23 to a further pulley 26 which is mounted on a further vertical shaft 27 which is also threaded below the pulley 26 and which threadedly engages the opposite end of the pressure bar 24. At their lower ends the shafts 21 and 27 are journalled into a plate 28 which forms a platform part of the frame and divides the intermediate and lower compartments 13 and 15. The upper ends of the shafts 21 and 27 are journalled into the upper wall of the compartment 10.

The pressure bar 24 extends between the shafts 21 and 27 and it will be seen that as the motor 11 rotates and the clutch 22 is energized the shafts 21 and 27 are simultaneously rotated to drive the bar 24 up and down. The underside of the bar 24 carries a plunger 31 which engages the top of a container 14 (FIG. 2) to discharge product from the container. The plunger 31 is shaped to engage a recess of the shape shown in dotted lines 33 in FIG. 4. Alternatively the container can be deformed to form the recess 33.

The container 14 is located in the compartment 13 by a part-cylindrical receiving means 35 defined by two part-cylindrical plates 36 and 37 which are spaced apart along each side to define vertical slots to admit the pressure bar 24 as the plunger 31 is moved up and down. The plates 36 and 37 can, however, be omitted.

The plates 36 and 37 are fixed to a base plate 38 which is hinged at its front edge 39 to the frame plate 38. The underside of the base plate 38 is supported by the frame plate 28 and part 38A of the plate 38 supports the lower end of the container and is of corresponding shape. A central opening in that part 38A of the base plate is aligned with a corresponding opening 40 in the frame plate 28 to receive an outlet 41 of the container. The opening 40 is formed with a Morse non-stick taper and the outlet 41 is formed with a corresponding taper to cause the outlet 41 to engage as a taper fit in the opening 40. The outermost end of the outlet is formed with a screw-threaded portion 42 whereby a cap (not shown) may be fitted to the container when stored.

The plate 36 is provided with a handle 43 and the arrangement of the receiving means 35 and plate 38 is such that the container 14 can be readily loaded and unloaded before and after discharge of the product. This is achieved by raising the plunger 31 to its uppermost position by operation of the motor 11; opening a door 44 at the front of the compartment 13 to gain access to the interior; then grasping the handle 43 to pivot the plate 38 forwards about the hinge 39. The container 14 can then simply be slid into the space defined by the plates 36 and 37 with its outlet 41 located in the opening in the base plate portion 38A. The plate 38 is then tilted backwards until it engages with the frame plate 28 whereupon the outlet 41 is made a taper fit in the opening 40.

Below the frame plate 38 and fixed to its underside is a fixed block 45 (FIG. 2) with an opening 46 aligned with the opening 40 and partially tapered to receive the lower end of the container outlet 41.

Below the fixed block 45 is a longitudinally slidable discharge member 47, shown in FIG. 2 in a discharge position. In this position a duct 48 in the member 47 has its inlet end aligned with the opening 46 in the block 45. From the inlet end the duct 48 extends generally horizontally along the member 47 towards a discharge nozzle 49 directed downwards. A shut-off valve member 51 is carried on the discharge member 47 for movement up and down under the control of, in this case, a manually-operated operating arm 52. The arm 52 is pivotally supported at 53 on the member 47 at one end, the opposite end having a handle 54. As the valve member 51 is moved down it passes into the discharge nozzle 49 to prevent product passing from the duct 48 into the nozzle 49. On upward movement of the arm 52 and hence the member 51 the nozzle 49 is opened and the upper end of the member 51 engages a switch arm 55 which operates a switch 56 for actuating the motor 11.

The slidable member 47 is keyed to the fixed block 45 and if the dispenser is to remain out of action for a period, the member 47 may be pushed in to a position which prevents product from passing from the container 14 into the duct 48. Moreover the product in the duct 48 can be retained frozen because the member 47 when pushed in can be substantially wholly located within the lower compartment 15 which is kept in a refrigerated condition.

Figure 8:
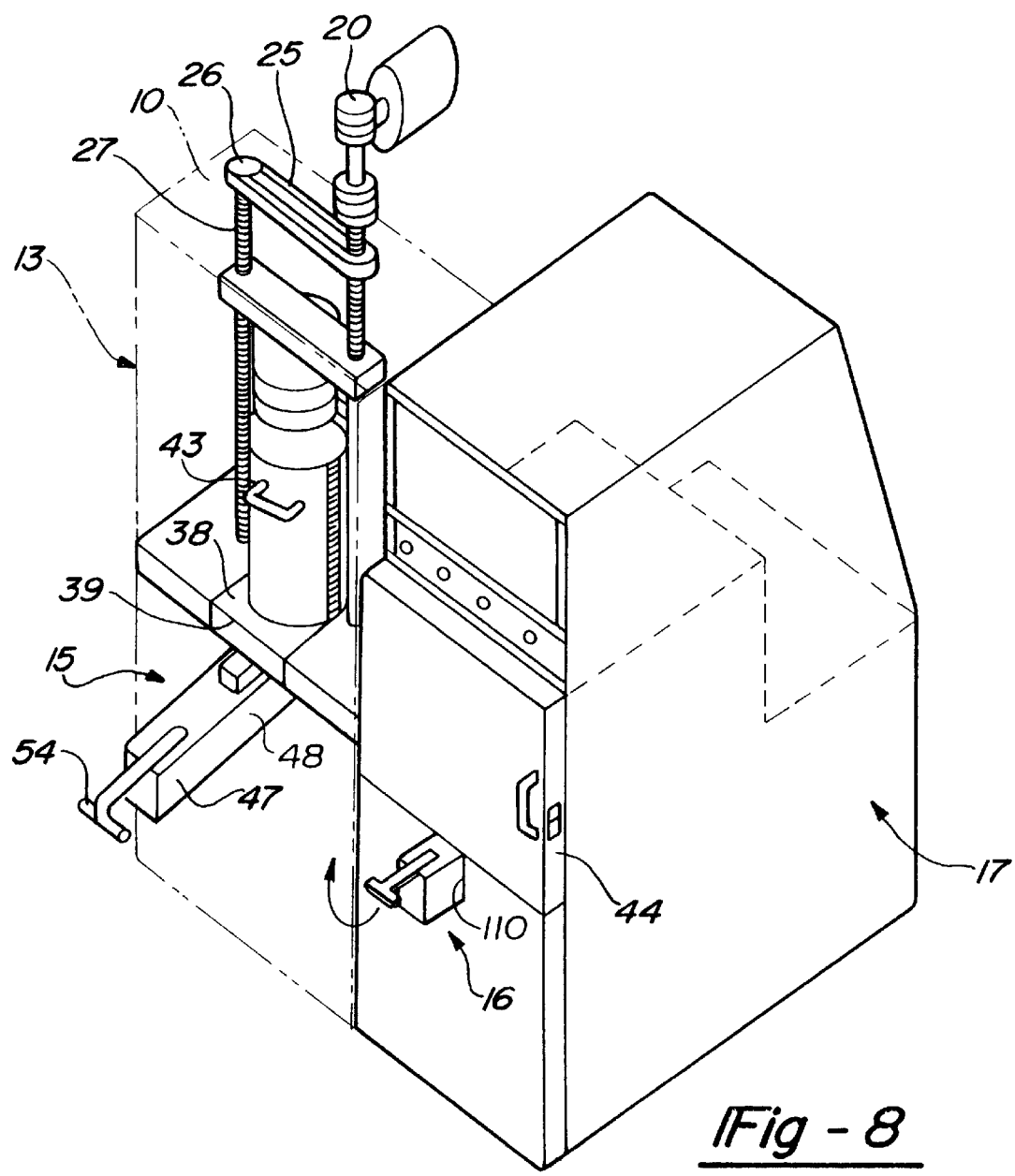
FIG. 8 is a general elevation showing a plurality of outlet ducts.

Instead of the duct 48 extending forwardly for dispensing at the front side of the apparatus or in addition to a forwardly extending duct, a duct may extend towards the rear of the apparatus for dispensing at this position. FIG. 8 illustrates one approach to two ducts 48 and 110 connected to a single container.

Figure 3:
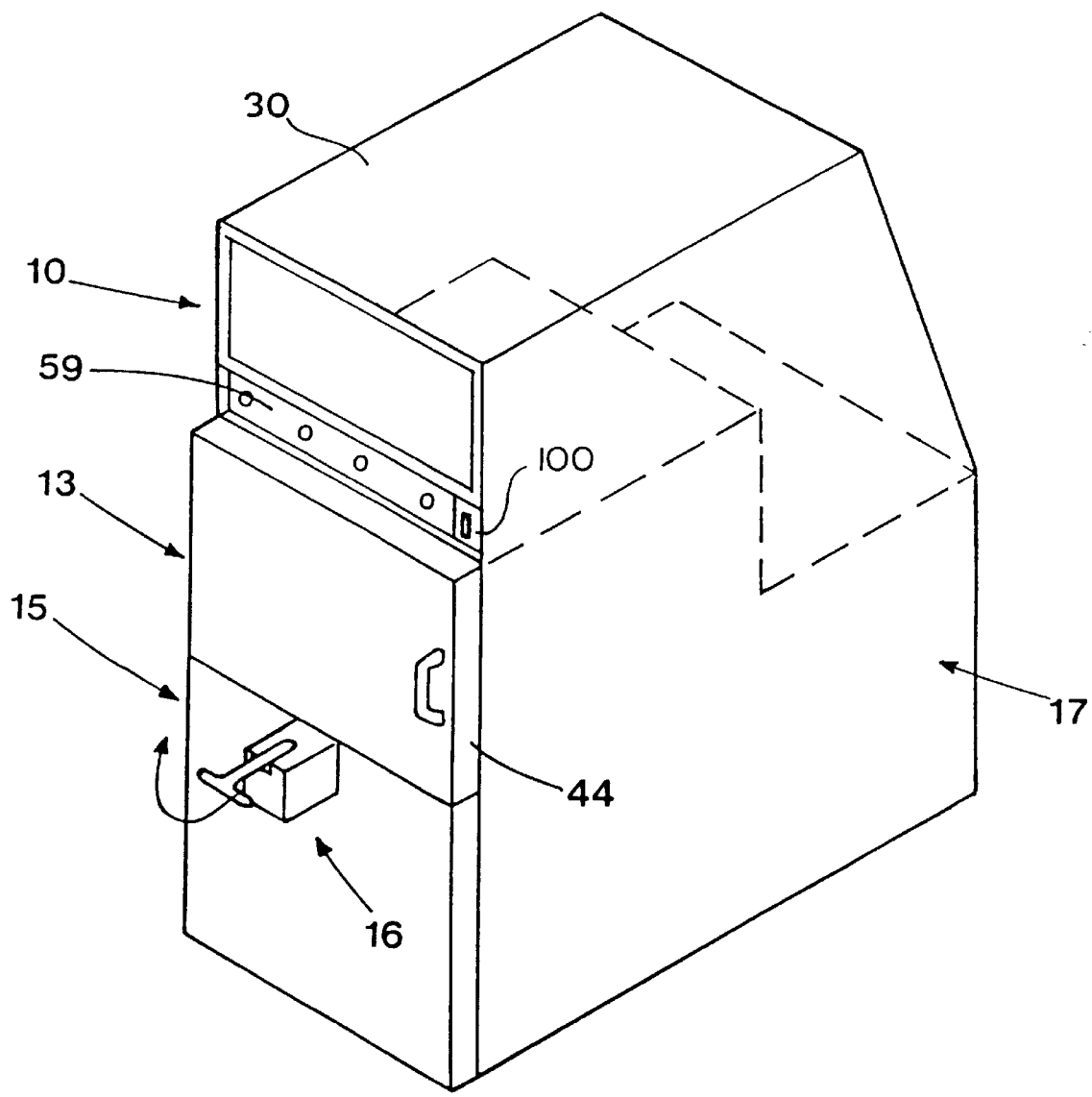
FIG. 3 is a general elevation.

Moreover the apparatus may be adapted for self service operation. In the latter case the apparatus, once energized (such as by a coin feed device 100, FIG. 3) will automatically dispense a predetermined quantity of product. This may be achieved by replacing the manually operated sliding member 47 by a powered arrangement and by suitable control of the motor 11.

In an alternative arrangement to that illustrated the container outlet may include a portion integral with the container 14, which extends through the opening 40 into a lower chamber and communicate with a deformable tube portion constituting part of a valve for controlling the discharge of product from the container.

The valve may also include a pneumatically operated piston and cylinder whose axis lies generally horizontally at a right angle to the deformable tube portion. The piston rod of the piston and cylinder carries on its free end a member for engaging and deforming the portion to open and close the portion and thereby enable product to pass along the portion during dispensing or to prevent discharge of the product by pinching the sides of the tube portion together. An abutment plate lies against the tube portion to resist the action of the piston and cylinder during closure of the valve.

At the free end of the valve, downstream of the deformable tube portion, is located an outlet means portion which is preferably shaped to shape the product during its discharge to give an attractive appearance.

Normally the product is dispensed into a container (not shown) which may be a cone or other edible container, or a receptacle such as a carton.

Controls 59 are located on the front wall of the upper compartment 10 for controlling the dispensing operation. Normally the controls would be set so that the container 14 is put under constant pressure by the motor 11 and the clutch 22 being energised to rotate, thereby tending to deform the container to reduce its internal volume and force the product through the outlet. Flow of product is controlled by the valve 51 so that to dispense the product it is only necessary to open the valve (as shown in FIG. 2) thereby allowing the product to pass along the duct 48 of the outlet and hence through the nozzle 49 for the required duration. If desired the operation of the motor 11 and/or clutch 22 may be automatically timed so that a predetermined amount of product is discharged over the predetermined time period. Upon de-energization of the clutch 22 pressure on the container may be released.

However in cases where product is only to be dispensed infrequently, or for example during overnight periods, the motor 11 may be de-energized to release pressure on the container 14.

Upon the container 14 becoming empty the motor 11 is driven to retract the plunger 31 to its full extent to raise the plunger 31 and the empty container 14 is removed and replaced by a fresh, full container.

Figure 4:
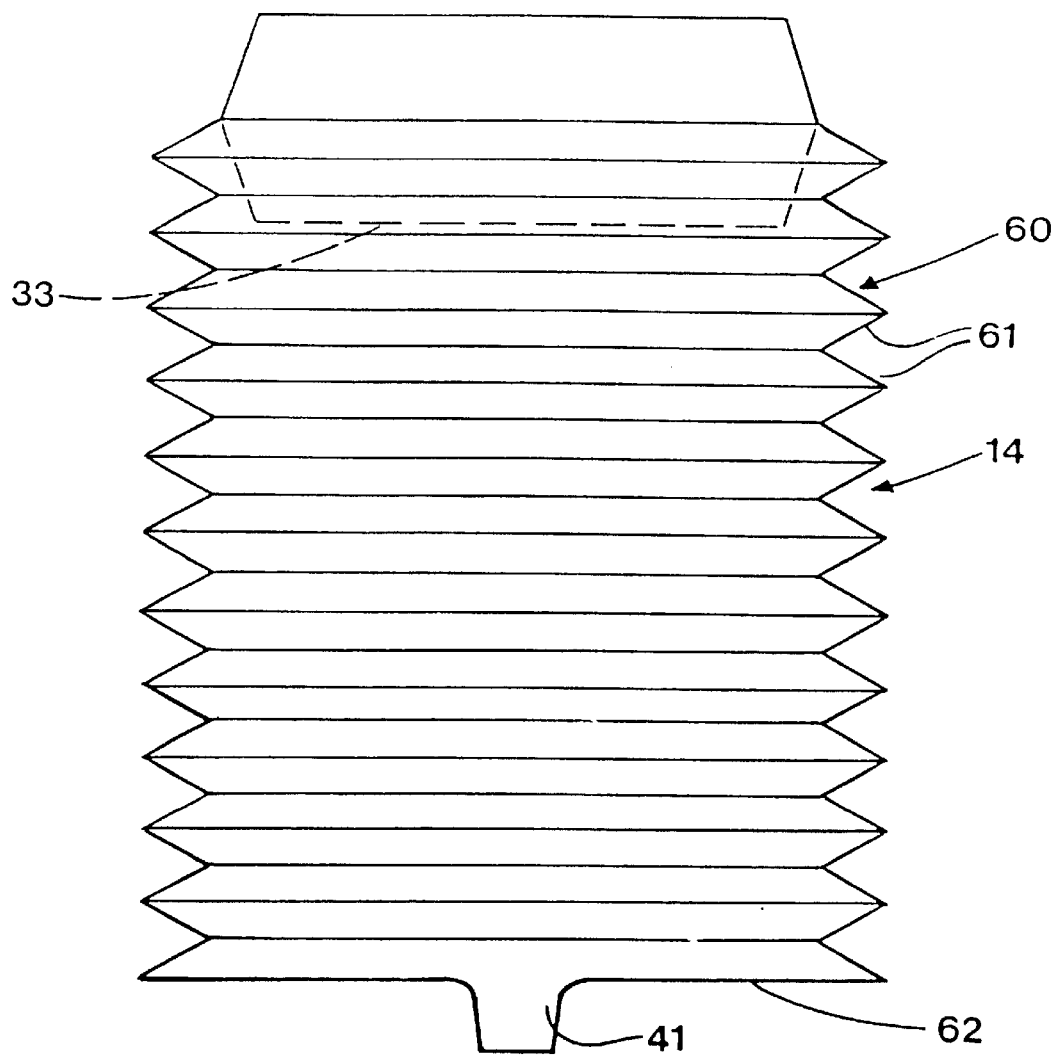
FIG. 4 is a side view of a container.
Figure 5:
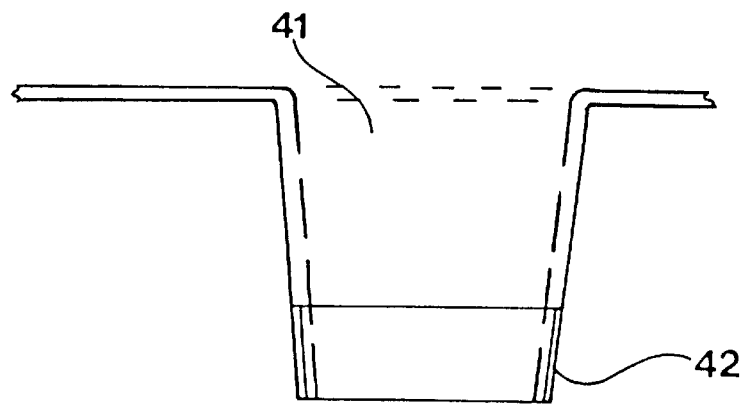
FIG. 5 is a side view of a container outlet.

The container 14 is shown in more detail in FIG. 4 and comprises a generally cylindrical body 60 in which is formed a series of corrugations 61 extending circumferentially so that the corrugations can be deformed in the axial direction of the body in the manner of a concertina or bellows. Alternatively the body 60 can be arranged to deform and reduce its internal volume by folding over the side walls on itself rather than using a bellows arrangement.

At the outlet end of the container the body presents a flat surface 62 at right angles to its axis so that the surface may engage the upper surface of the base plate 36. Internally the lower or outlet end of the container may be profiled to taper towards its lower end and towards the outlet 41.

At the opposite end of the container the body is formed with the recessed portion 33 to receive the plunger 31.

The container is preferably made of flexible plastics material and may be formed by blow molding.

During manufacture the outlet 41 is formed integrally of the body.

In dispensing frozen product the container needs to be deformable at relatively low temperatures of, say, −10° C. to −25° C. The container will normally be filled with product at the site of a product manufacturer and supplied as and when necessary to the apparatus user who may be a mobile or fixed retail outlet, a restaurant or other facility. Product is poured into the container through the opening which, in a dispensing operation, is the outlet, and the product is then frozen for distribution.

It will be appreciated that several dispensing apparatus each with their associated container and individual discharge control means may be provided in a single cabinet whereby several different products or different product flavors can be dispensed.

If any of the dispensing means should fail or require maintenance a replacement can be easily fitted by forming each dispensing means as a module.

Moreover the manner of dispensing and the nature of the container is such that the product can take many forms and can include solids such as fruit, nuts and chocolate.

Part of the apparatus, for example the compartment 13, may be arranged to provide a refrigerated storage area for filled spare containers.

If desired the dispensing means may be made manually operable to obviate the need for a power supply, other than for refrigeration, if required.

For mobile apparatus the cooling function for the cabinet may be provided at a fixed location and effected overnight, the cabinet being adequately insulated to keep the desired temperature of the product in the cabinet.

Although it is preferred that the container is cylindrical it will be seen that other shapes are possible. Moreover although the apparatus is illustrated with the container 14 in an upright position the container may be arranged horizontally or at a vertically inclined position.

Figure 2:
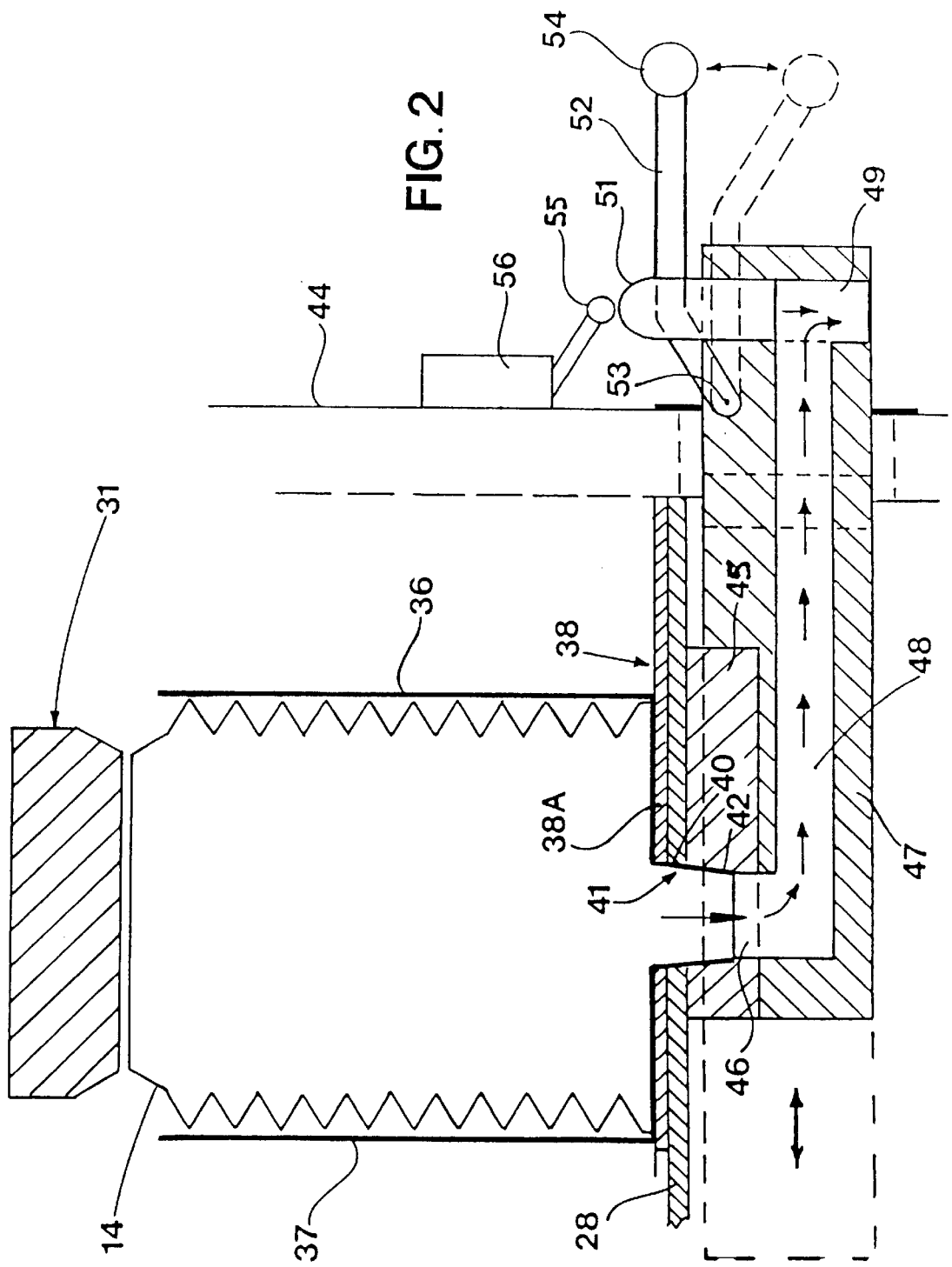
FIG. 2 is a part sectional side elevation.
Figure 6:
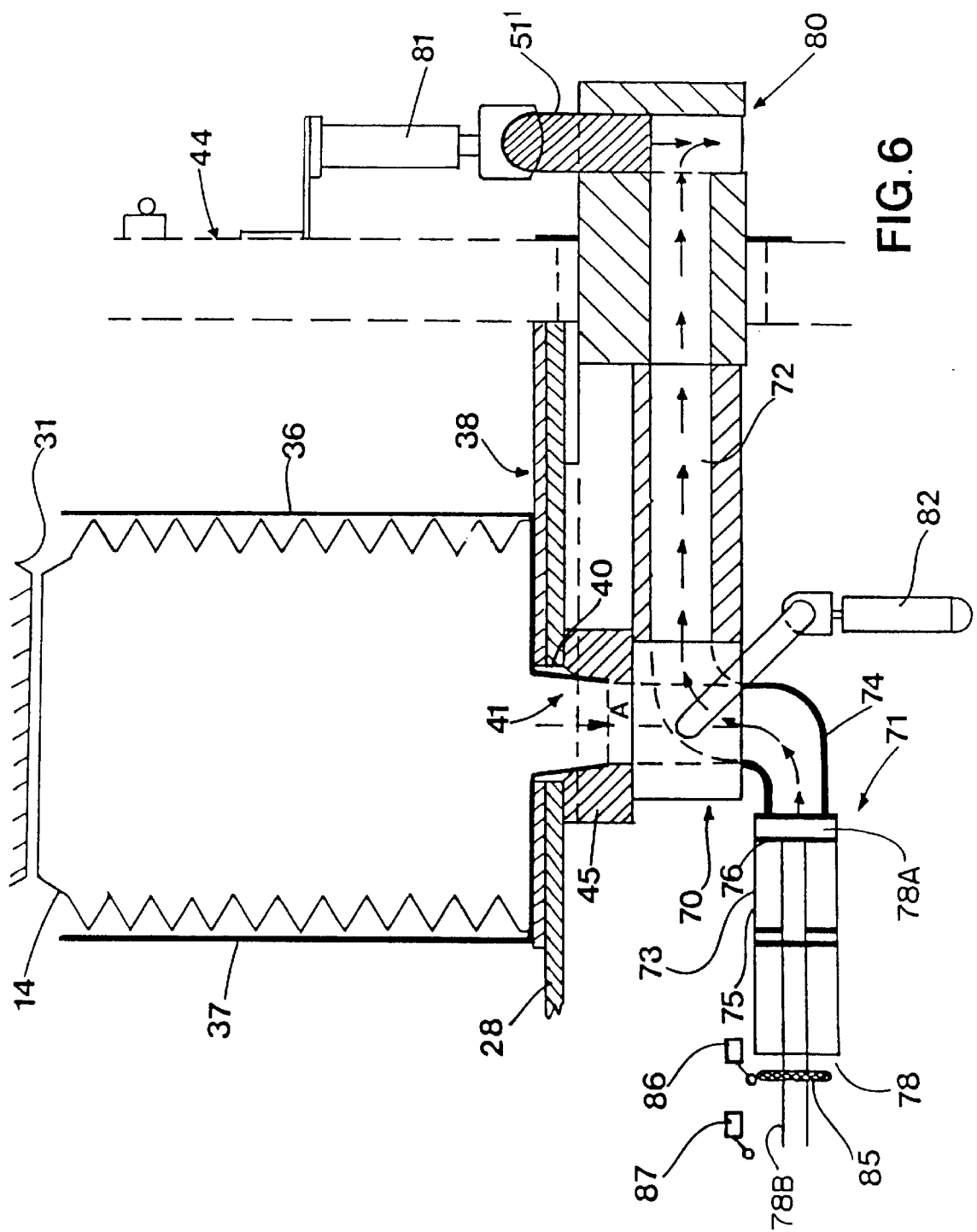
FIG. 6 is a side elevation showing alternative outlet means.

As an alternative to the dispensing arrangement of FIG. 2 an arrangement such as shown in FIG. 6 may be employed. In the FIG. 6 arrangement the container 14, the drive arrangement and the container outlet 41 may be arranged as for the previous embodiment. But instead of the duct arrangement 48 there is provided below the block or manifold 45 a three-way valve 70, the valve 70 communicating selectively between the container interior and a dosing device 71, and between the dosing device 71 and an outlet duct 72. Product is conducted from the valve 70 to a piston and cylinder device 73 through a pipe 74 during a container discharge operation.

The piston and cylinder device 73 includes a cylinder 75 in which is located a piston 76 for defining a compartment for receiving product into the cylinder from the container 14. Movement of the piston 76 in the cylinder 75 is achieved by a pneumatically-operated piston and cylinder drive 78. Movement of the drive in a filling direction (to the left as seen in FIG. 6) allows product to be directed into the cylinder 75 against the piston 76.

Operation of the valve 70 to communicate between the cylinder 75 and the outlet duct 72 enables the cylinder 75 to be discharged by operation of the piston and cylinder drive 78. A quantity of product equal to the swept volume of the cylinder 75 is discharged along the pipe 74 through the valve 70 and along the duct 72 towards a discharge nozzle 80.

The nozzle outlet 80 is controlled by a valve member 51' movable up and down in the nozzle outlet 80 under the action of a further pneumatically-operated piston and cylinder device 81.

A piston and cylinder device 82 actuates the valve 70 between said positions and the duct 72 is defined by a fixed member 83.

The stroke of the piston 76 in the cylinder 75 can be adjusted to vary the amount of product to be dispensed, if desired. For this purpose a piston 78A of the drive 78 is mounted on a piston rod 78B which rod protrudes from the cylinder 75 and carries a longitudinally adjustable member 85. Proximity switches 86 and 87 lie adjacent the path of the member 85 to be operated upon movement of the piston 78A and piston rod 78B and to start and stop the drive 78.

It will be seen that this arrangement lends itself to automatic operation of the dispensing of predetermined amounts of product. The dispensing of product thus follows a sequence, starting with the valve 70 in a position to direct product from the container to the dosing device 71, in which the first step is to fill the cylinder 75. Then, when filled, the cylinder 75 is emptied, having moved the valve 70 to its other position, by operation of the drive 78 and opening of the valve member 51'. The product is discharged through the nozzle outlet 80.

When discharge is complete the valve member 51' is closed and the valve 70 is returned to its initial position to refill the cylinder 75 ready for a commencement of a repeat sequence.

The various drive means and valves may be controlled to follow the sequence automatically to allow coin feed or other dispensing operation by the customer or an operative.

It will be appreciated that the drive motor 11 for deforming the container 14 may be operable at variable speed to vary the rate at which product is discharged from the container.

It is also possible to have two or more outlets for simultaneously dispensing product at two or more locations from the same container. For example there may be outlets on different sides of the apparatus.

Figure 7:
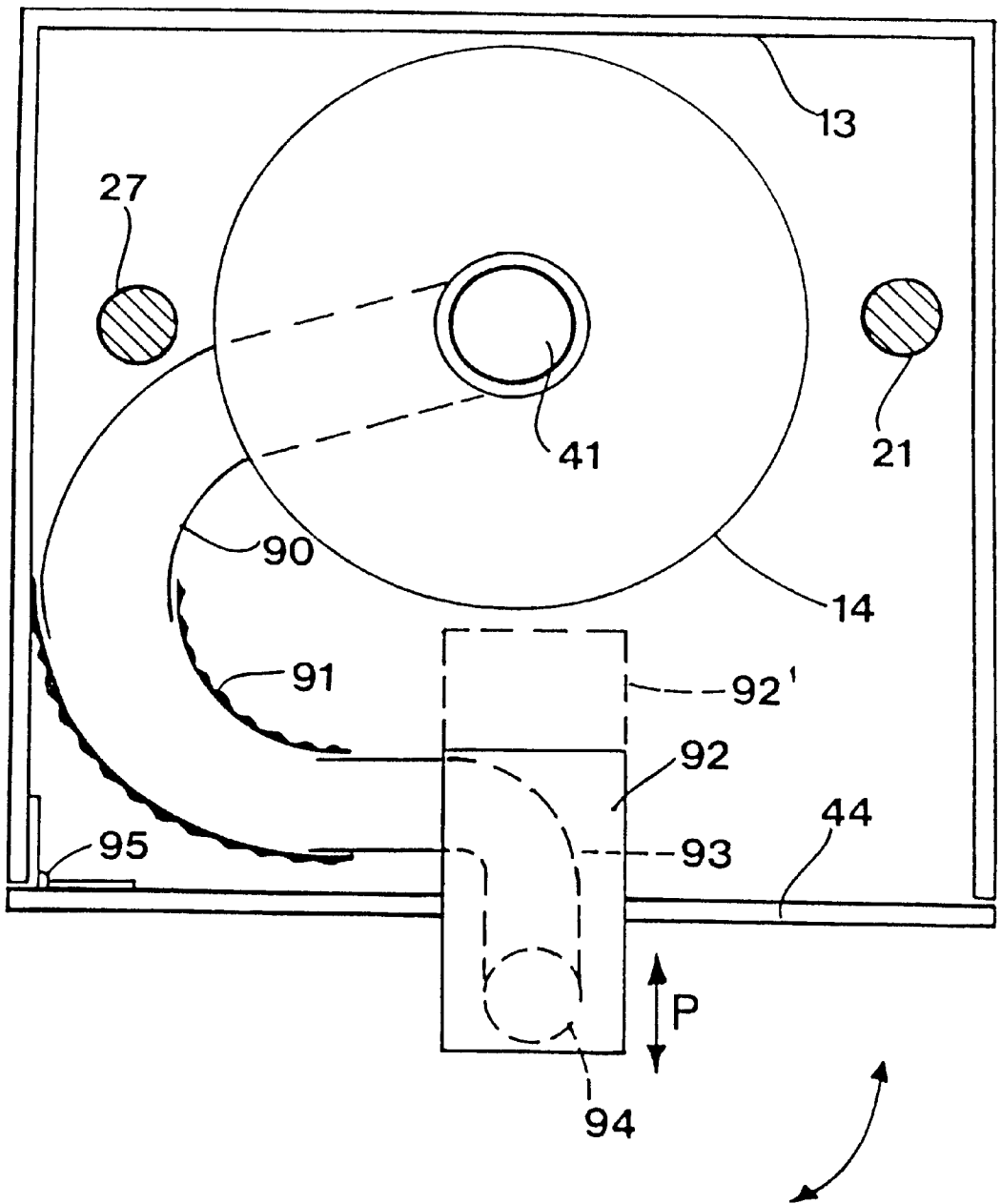
FIG. 7 is a plan view showing other outlet means.

A further alternative to the discharge arrangements of FIGS. 2 and 6 is shown in FIG. 7.

In FIG. 7 the apparatus includes the same three compartment configuration and container compression arrangement as described previously but, instead of the discharge arrangements for discharging the product from the container outlet 41, described above, the outlet 41 discharges directly into a fixed duct 90.

The duct 90 communicates with a flexible length of ducting 91 which, in turn, communicates with a body 92 having an internal duct 93 leading to a downwardly directed outlet 94.

A valve arrangement (not shown) in FIG. 7 of the kind shown in FIG. 2 or FIG. 6 controls the discharge of product along the duct 90, the ducting 91 and the duct 93.

The duct arrangement enables the body 92 to be moved backwards and forwards into and out of the lower compartment 15 in the direction of the arrow P depending on whether a dormant or operative action of the dispensing apparatus is required. Moreover the provision of the flexible ducting 91 enables the door 44 to be opened and closed without disconnection of any of the discharge arrangements. For this purpose the door 44 is hinged at 95 adjacent the flexible ducting. For the movement P and for the door opening movement the flexible ducting is able to accommodate the relative movement between the body 92 and the fixed duct 90.

As seen in FIG. 7 the body 92 is in its discharge position, the dormant or non-dispensing position being shown in chain line 92'.

I claim:

1. An apparatus for dispensing a frozen product, said apparatus comprising a container for containing said frozen product, said container having an end with an outlet integral therewith, said outlet having an area less than the area of said end of said container, dispensing means for receiving said container and for dispensing said frozen product from said container through said outlet, a refrigerated housing surrounding said container, and an outlet duct in sealed communication with said outlet of said container, whereby during dispensing said frozen product travels through said outlet duct from a location within said refrigerated housing to a location outside said refrigerated housing.

2. The apparatus of claim 1, wherein said outlet duct has a first end and a second end, said first end of said outlet being adjacent said end of said container.

3. The apparatus of claim 1 wherein said container further comprises side walls, said container adapted to deform and reduce an internal volume of said container by folding said side walls over each other.

4. The apparatus of claim 3, wherein said side walls include corrugations.

5. The apparatus of claim 4, wherein said container is generally cylindrical and said corrugations extend circumferentially.

6. The apparatus of claim 1, further comprising a container holding means, said container holding means holding said container in a vertical orientation.

7. The apparatus of claim 1, further comprising a container holding means, said container holding means being at least partially disposed about said container.

8. The apparatus of claim 1, wherein said dispensing means comprises drive means, said drive means adapted to exert pressure on said frozen product so that said drive means is not in engagement with said frozen product upon actuation of said drive means.

9. The apparatus of claim 8, wherein said drive means comprises a piston.

10. The apparatus of claim 8, wherein said drive means comprises a plunger, said container having a top opposite said outlet, said plunger engaging said top of said container to exert pressure on said frozen product upon actuation of said drive means.

11. The apparatus of claim 1, wherein said dispensing means further comprises means for controlling the discharge of said product from said apparatus.

12. The apparatus of claim 1, wherein said means for controlling discharge of said product comprises a valve, said valve comprising a flexible-walled tube, whereby said discharge control means is operated by pinching together said walls of said tube.

13. The apparatus of claim 11, wherein said means for controlling discharge comprises a valve.

14. The apparatus of claim 13, wherein said valve is interposed in said outlet duct.

15. The apparatus of claim 1 wherein said dispensing means comprises a plurality of dispensing assemblies and containers within a single refrigerated housing.

16. The apparatus of claim 1, wherein said refrigerated housing has a front portion through which said outlet duct extends.

17. The apparatus of claim 1, wherein said refrigerated housing is adapted to accommodate at least one spare container for refrigerated storage.

18. The apparatus of claim 1, wherein said outlet duct is oriented horizontally.

19. The apparatus of claim 1, wherein said outlet duct is formed within a slidable member when said slidable member is first in a first position, said outlet duct is substantially wholly located within said refrigerated housing.

20. The apparatus of claim 1, wherein said outlet duct is at least partially located in said refrigerated housing.

21. The apparatus of claim 1, wherein said outlet duct has a diameter, said diameter being sufficient to allow the passage of particulate matter container within said frozen product through said outlet duct.

22. The apparatus of claim 1 and further comprising more than one outlet duct connected to a single container.

23. The apparatus of claim 1 and further comprising means for automatically releasing dispensing pressure on said container after a preset time period.

24. The apparatus of claim 1 wherein said outlet duct further comprises a plurality of outlet ducts.

25. The apparatus of claim 1, wherein said outlet duct is integral with said container.

26. An apparatus for dispensing frozen product, said apparatus comprising:
   a container containing said frozen product, said container having an end with an outlet integral therewith, said outlet having an area less than the area of said end of said container;
   container holding means to hold said container;
   dispensing means for receiving said container and for dispensing said frozen product from said container through said outlet;
   a refrigerated housing surrounding said container and said container holding means;
   and an outlet duct in sealed communication with said outlet;
   said container holding means being mounted on a base plate located above said outlet duct and having a front edge, said front edge hingeably connected to a frame plate;
   whereby during dispensing said frozen product travels through said outlet duct from a location within said refrigerated housing to a location outside said refrigerated housing.

27. An apparatus for dispensing frozen product, said apparatus comprising:
- a container containing said frozen product, said container having an end with an outlet integral therewith, said outlet having an area less than the area of said end of said container;
- dispensing means for receiving said container and for dispensing said frozen product from said container through said outlet;
- a refrigerated housing surrounding said container;
- an outlet duct in sealed communication with said outlet of said container;
- and volume measuring means located inside said refrigerated housing;
- whereby said frozen product from said container is divided in said refrigerated housing according to a pre-measured volume and subsequently discharged in said pre-measured volume to a location outside of said refrigerated housing.

28. The apparatus of claim 27 wherein said volume measuring means is automatically actuatable.

29. The apparatus of claim 28 wherein said automatic actuation comprises coin-operated means.

30. An apparatus for dispensing a frozen product, said apparatus comprising:
- a container for containing said frozen product, said container having an end with an outlet integral therewith, said outlet having an area less than the area of said end of said container;
- dispensing means for receiving said container and for dispensing said frozen product from said container through said outlet;
- a refrigerated housing surrounding said container;
- a volume measuring means;
- and an outlet duct in sealed communication with said outlet;

whereby said frozen product from said container is volume measured and discharged to a location outside of said refrigerated housing.

31. The apparatus of claim 30, wherein said outlet duct has a first end and a second end, said first end of said outlet being adjacent said end of said container.

32. The apparatus of claim 30 wherein said container further comprises side walls, said container adapted to deform and reduce an internal volume of said container by folding said side walls over each other.

33. The apparatus of claim 32, wherein said side walls include corrugations.

34. The apparatus of claim 33, wherein said container is generally cylindrical and said corrugations extend circumferentially.

35. The apparatus of claim 30, further comprising a container holding means, said container holding means holding said container in a vertical orientation.

36. The apparatus of claim 30, further comprising a container holding means, said container holding means being at least partially disposed about said container.

37. The apparatus of claim 30, wherein said dispensing means comprises drive means, said drive means adapted to exert pressure on said frozen product so that said drive means is not in engagement with said frozen product upon actuation of said drive means.

38. The apparatus of claim 37, wherein said drive means comprises a piston.

39. The apparatus of claim 37, wherein said drive means comprises a plunger, said container having a top opposite said outlet, said plunger engaging said top of said container to exert pressure on said frozen product upon actuation of said drive means.

40. The apparatus of claim 1, wherein said dispensing means further comprises means for controlling the discharge of said product from said apparatus.

41. The apparatus of claim 40, wherein said means for controlling discharge of said product comprises a valve.

42. The apparatus of claim 41, wherein said valve comprises a flexible-walled tube, whereby said discharge control means is operated by pinching together said walls of said tube.

43. The apparatus of claim 41, wherein said valve is interposed in said outlet duct.

44. The apparatus of claim 30 wherein said dispensing means comprises a plurality of dispensing assemblies and containers within a single refrigerated housing.

45. The apparatus of claim 30, wherein said refrigerated housing has a front portion through which said outlet duct extends.

46. The apparatus of claim 30 wherein said refrigerated housing is adapted to accommodate at least one spare container for refrigerated storage.

47. The apparatus of claim 30, wherein said outlet duct is oriented horizontally.

48. The apparatus of claim 30, wherein said outlet duct is formed within a slidable member which when said slidable member is first in a first position, said outlet duct is substantially wholly located within said refrigerated housing.

49. The apparatus of claim 30, wherein said outlet duct is at least partially located in said refrigerated housing.

50. The apparatus of claim 30, wherein said outlet duct has a diameter, said diameter being sufficient to allow the passage of particulate matter container within said frozen product through said outlet duct.

51. The apparatus of claim 30, further comprising more than one outlet duct connected to a single container.

52. The apparatus of claim 30 wherein said volume measuring means is automatically actuatable.

53. The apparatus of claim 52 wherein said automatic actuation comprises coin-operated means.

54. The apparatus of claim 30, wherein said volume measuring means comprises timing means for timing dispensing of the frozen product.

55. The apparatus of claim 30, wherein said dispensing means further comprises means for controlling discharge of the frozen product from said apparatus, said volume measuring means operative to control said controlling means for dispensing a predetermined amount of product.

56. The apparatus of claim 55, wherein said volume measuring means comprises timing means for timing dispensing of the frozen product.

57. The apparatus of claim 49, wherein said volume measuring means comprises a piston disposed in a cylinder, said piston movable within said cylinder to define a swept volume, said volume measuring means in flow communication with said outlet duct.

58. The apparatus of claim 49, wherein said volume measuring means comprises a valve interposed in said outlet duct, said volume measuring means further comprising a dosing device in flow communication with said valve for measuring a predetermined quantity of the frozen product, whereby during dispensing, the frozen product travels from said valve to said dosing device and is discharged in measured quantities.

59. The apparatus of claim 30 and further comprising means for automatically releasing dispensing pressure on said container after a preset time period.

* * * * *